United States Patent [19]

Dildy, Jr. et al.

[11] 3,858,085
[45] Dec. 31, 1974

[54] DIGITAL RASTER GENERATOR

[75] Inventors: Clell A. Dildy, Jr.; Arthur K. Dettbarn, both of Panama City, Fla.

[73] Assignee: The United States of America as represented by the Secretary of the Navy, Washington, D.C.

[22] Filed: July 9, 1973

[21] Appl. No.: 377,886

[52] U.S. Cl............ 315/367, 340/324 R, 340/5 MP, 343/17
[51] Int. Cl.............................................. H01j 29/70
[58] Field of Search ........ 343/5 DP, 11; 340/324 R, 340/324 A; 235/92 N, 198; 315/22–24

[56] References Cited
UNITED STATES PATENTS

| | | | |
|---|---|---|---|
| 3,476,974 | 11/1969 | Turnage et al......................... | 315/23 |
| 3,540,032 | 11/1970 | Criscimagna et al........... | 340/324 A |
| 3,597,757 | 8/1971 | Vincent-carrefour et al.. | 340/324 A |
| 3,629,841 | 12/1971 | Hare.............................. | 340/324 A |
| 3,761,765 | 9/1973 | Machin et al........................ | 315/23 |

Primary Examiner—Maynard R. Wilbur
Assistant Examiner—T. M. Blum
Attorney, Agent, or Firm—Richard S. Sciascia; Don D. Doty; Harvey A. David

[57] ABSTRACT

A digital raster signal generator is disclosed in combination with a sonar or radar and a cathode ray tube for producing a sector scan display of acquired targets. Included therein is a digital channel counter, a digital range counter, a reference digital-to-analog converter, a bipolar digital sine read only memory, a bipolar digital cosine read only memory, and a pair of multiplying digital-to-analog converters interconnected in such manner as to effect such horizontal and vertical sweep voltages as will produce the aforesaid sector scan display of acquired targets on the face of said cathode ray tube.

17 Claims, 5 Drawing Figures

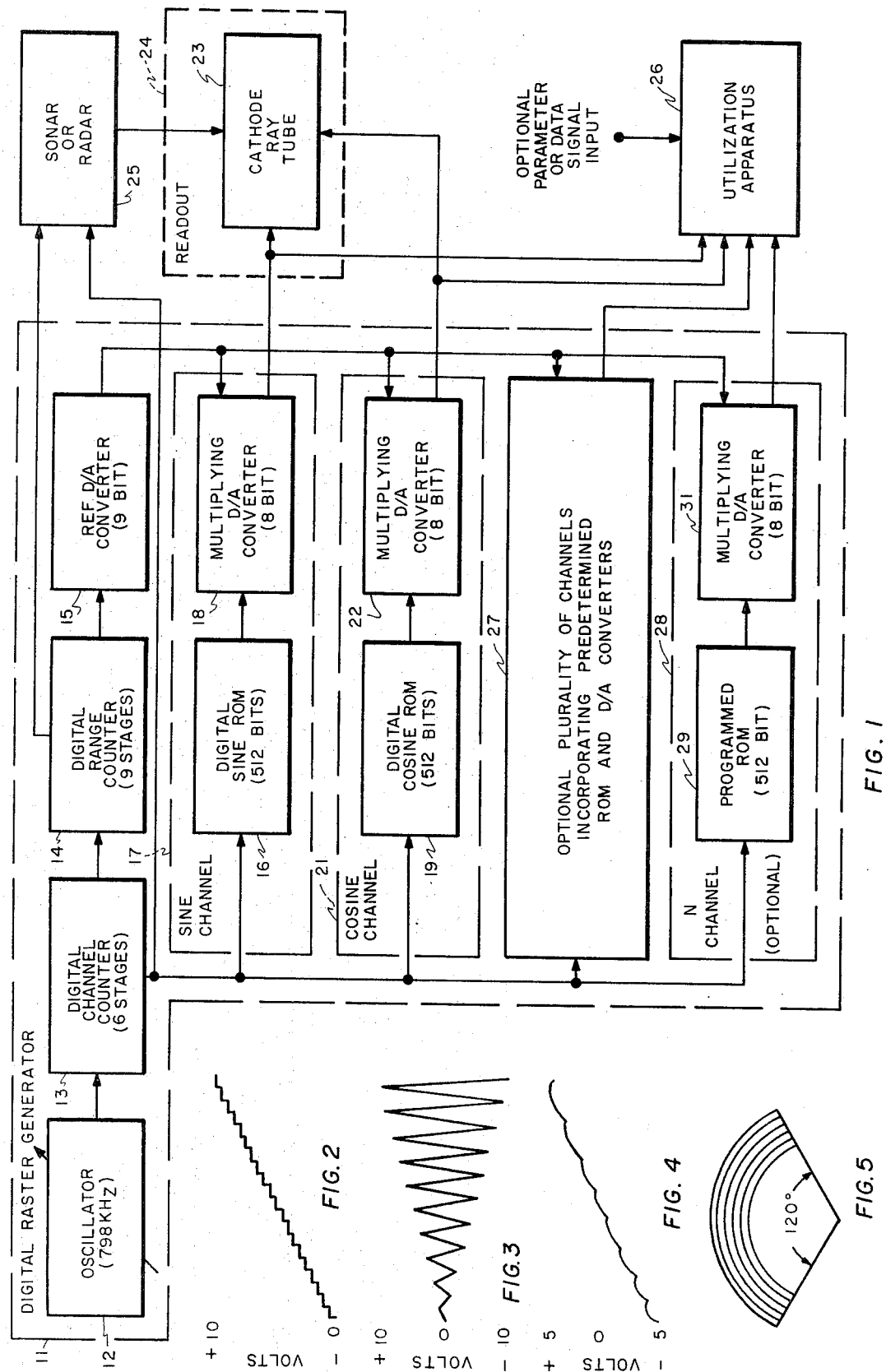

DIGITAL RASTER GENERATOR

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The present invention, in general, relates to electrical and electronic signal and function generators, and, in particular, it is a unique method and means for generating a voltage signal waveform suitable for use as a plan position indicator sector scan sweep voltages. In even greater particularity, the subject invention is a digital raster generator which produces horizontal and vertical sweep voltages suitable for being used in conjunction with a digital sector scan converter, the deflection system of a cathode ray tube or other appropriate readout, and any other compatible utilization apparatus.

DESCRIPTION OF THE PRIOR ART

Heretofore, numerous horizontal and vertical sweep signal generators have been employed for the purpose of generating polar and other rasters for such devices as sector scan sonar systems, television sets, data plotters, signal processors, and the like, employing digital techniques. For instance, it has been quite common to effect electron beam sweep and rotation by means of a rotating electromagnetic yoke; in other situations, it has been necessary to modulate a sawtooth voltage waveform by means of a synchro-resolver. Moreover, elaborate digital computer systems and beam forming networks, including delay means, have been employed, in order to provide sector scan type readouts.

For many practical purposes, the aforementioned and other prior art techniques and devices for generating horizontal and vertical sweep signals have been quite satisfactory, although in some instances, instability, drift, lack of repeatability, etc., have been sufficiently prevalent to leave something to be desired, as far as accuracy and intelligibility are concerned.

SUMMARY OF THE INVENTION

The instant invention overcomes many of the disadvantages of the prior art because it is very accurate, very fast acting, and very reliable compared to all of the known devices of the prior art. Furthermore, because it is capable of being manufactured as substantially a solid state package, it may be miniaturized to the extent that it is quite compact and, therefore, not unwieldy or excessively space consuming.

Briefly, such advantages are obtainable from the subject invention because it comprises only such components as an oscillator, counters, read only memories, and and converters, which, likewise, may each be made as self-contained, miniaturized units and then be easily, expeditiously, and economically combined, as taught herewith, to become a new and improved combination thereof for new and advanced technology purposes.

It is, therefore, an object of this invention to provide an improved digital raster generator.

Another object of this invention is to provide an improved method and means for accurately generating a voltage waveform suitable for use as a sonar plan position indicator sector scan sweep voltage for use in conjunction with a digital scan converter.

A furthere object of this invention is to provide a cathode ray tube deflection system which will combine and interact easily with compatible digital computer control and digital processing systems.

Still another object of this invention is to provide a digital marker generator which facilitates the positioning of a visual marker on the face of a cathode ray tube, oscillograph, or the like.

Still another object of this invention is to provide an improved method and means for effecting the shaft positioning of two phase motors, resolvers, and other compatible utilization apparatus in accordance with data signal inputs and a predetermined program.

A further object of this invention is to provide an improved sonar, radar, or other system readout.

Another object of this invention is to provide an improved polar raster generator.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 1 is a block diagram of the digital raster generator constituting the subject invention;

FIG. 2 is a partial ideal waveform representation of the 512 step voltage signal which emanates from the output of the reference digital-to-analog converter of the digital raster generator of FIG. 1;

FIG. 3 is a partial ideal waveform representation of the output signal which emanates from the digital-to-analog converter of the sine channel of the digital raster generator of FIG. 1;

FIG. 4 is a partial ideal waveform representation of the output signal which emanates from the digital-to-analog converter of the cosine channel of the digital raster generator of FIG. 1; and FIG. 5 discloses a representative 512 line raster which is effected within a 120° sector scan on the face of the cathode ray tube of the system depicted in the system of FIG. 1.

DESCRIPTION OF THE PREFERRED EMBODIMENT

Referring now to FIG. 1, the digital raster generator 11 constituting this invention is depicted as comprising an adjustable but preferably 798 KHz oscillator 12, the output of which is connected to the input of a six stage digital channel counter 13 of the SN74193 type manufactured by the Texas Instruments Company of Dallas, Texas. The output of channel counter 13 is connected to the input of a nine stage digital range counter 14 of the SN74193 type manufactured by the Texas Instruments Company of Dallas, Texas, with the output thereof connected to the input of a nine-bit multiplying reference digital-to-analog (D/A) converter 15 of the DAC372 type manufactured by Hybrid Systems Corporation of Burlington, Massachusetts, and disclosed in Bulletin No. 372-9-1 thereof, dated 1971.

The output of the aforesaid six stage digital channel counter 13 is also connected to the input of a 512 bit digital sine read only memory (ROM) 16 of a sine channel 17.

Sine ROM 16 is preferably of the 512 bit bipolar digital type read only memory manufactured by the Harris Semiconductor Division of the Harris-Intertype Corporation of Melbourne, Florida. For example, sine ROM 16 may be similar to that disclosed in sales literature of the Harris Semiconductor Division, identified as HPROM-0512, dated 1971.

Also located within sine channel 17 is an 8-bit digital-to-analog multiplying (D/A) converter 18, the data input of which is connected to the output of the aforesaid sine ROM 16. The reference signal input of digital-to-analog converter 18 is connected to the output of the aforementioned reference digital-to-analog converter 15.

Also connected to the output of the aforesaid six stage channel counter 13 is a 512 bit digital cosine read only memory (ROM) 19 which is incorporated in a cosine channel 21. Cosine ROM 19 is identical to the aforementioned sine ROM 16, with the exception that it is programmed to perform in accordance with a cosine function instead of the sine function with which ROM 16 is programmed. Another 8-bit multiplying digital-to-analog converter 22 identical to multiplying digital-to-analog converter 18 has its data signal input connected to the output of cosine ROM 19. The reference signal input thereof, like the reference signal input of the aforementioned digital-to-analog converter 18, is connected to the reference signal output of reference digital-to-analog converter 15.

It would perhaps be noteworthy at this time that the aforesaid sine and cosine read only memories 16 and 19 are key components of this invention, since as will be discussed more fully subsequently, they perform their respective functions with accuracies and speeds heretofore unattainable from the prior art.

The output of the aforesaid digital-to-analog converter 18 and the output of digital-to-analog converter 22, in this particular preferred embodiment, are connected to the horizontal sweep input and the vertical sweep input of a cathode ray tube 23, respectively.

Although, in this particular instance, cathode ray tube 23 is indicated as being the readout for the subject digital raster generator 11, it should be understood that any other compatible readout 24 may be substituted therefor without violating the spirit or scope of the invention, inasmuch as so doing would obviously be well within the purview of one skilled in the art having the benefit of the teachings presented herewith.

Furthermore, in this particular preferred embodiment, a multi-channel (preferably 60 channel) sonar (or radar) 25 of the conventional channel scanning type — and, therefore, incorporating a channel scanner therein for such purpose — is illustrated as a typical multi-channel utilization apparatus having the data or video output thereof connected to the data or video input of cathode ray tube 23 or other readout 24, as the case may be. The channel scanner input of said sonar 25 is connected to the address output of the aforesaid six stage digital channel counter 13, so that sonar 25 is addressed in such a programmed manner that some sonar channel puts out a video signal in correspondence therewith at any given instant. Said address is, of course, the same address that is supplied to the aforementioned read only memories 16 and 19 and will be depicted in greater detail by a program table presented subsequently.

The range input of sonar (or radar) 25 is connected to the transmit initiate pulse output of nine stage digital range counter 14 for the purpose of being triggered to transmit a sonar search signal every time range counter 14 is at zero.

For purposes of emphasis, it would appear to again be noteworthy that the applicability of the subject digital raster generator is such that it may be usefully combined with numerous other equipments requiring the cathode ray tube or other readout disclosed in FIG. 1.

Moreover, it should be understood that the horizontal sweep signal and vertical sweep signal outputs of digital raster generator 11 may be employed to properly operate such X and Y coordinant input devices as oscillographs, two-phase motors, resolvers, and some servo mechanism systems. Of course, for some purposes, they may also be connected to appropriate inputs of any other compatible utilization apparatus 26.

As can be seen from FIG. 1, an optional plurality of channels 27 incorporating predetermined digital read only memories (ROMs) and multiplying D/A converters may, likewise, be included in the subject invention. Of course, the inclusion thereof would be contingent upon the type of performance required of the subject system. In any event, the data signal inputs would be connected to the data output of the aforementioned channel counter 13, and the reference signal inputs thereof would be connected to the output of the aforementioned reference digital-to-analog converter 15.

In order to more fully explain said plurality of channels 27, a specific N channel 28, which is likewise optional, has been shown in FIG. 1. Again, like the aforementioned sine and cosine channels 17 and 21, N channel 28 incorporates a programmed digital ROM 29 which, in fact, is a read only memory of the type manufactured by the aforementioned Harris Semiconductor Division of the Harris-Intertype Corporation but, in this particular instance, it is disclosed as being programmed with any predetermined program which would be suitable for any given operational purposes. The output of programmed read only memory 29 is connected to the input of an 8-bit multiplying digital-to-analog converter 31, the reference signal input of which is connected to the output of the aforementioned reference digital-to-analog converter 15. Of course, said optional channels 27 and 28 have their operative signal outputs respectively connected to the appropriate operative signal input of said utilization apparatus 26, which may or may not include a cathode ray tube or other readout, depending upon the operational circumstances thereof.

Because FIGS. 2, 3, and 4, respectively disclose idealized signal waveforms which emanate from the outputs of various ones of the components of the digital raster generator of FIG. 1, they will be discussed in greater detail in conjunction with the explanation of the operation of the subject invention.

Likewise, the portrayal of a polar scan disclosed in FIG. 5 — which is the raster that would be seen by any human or other operator monitoring the face of the aforementioned cathode ray tube 23 — will be discussed in greater detail subsequently.

THEORY OF OPERATION

In this particular instance, the theory of operation of the subject invention will be discussed in connection with an exemplary multi-channel sonar system, since the display therefor is ordinarily a pie-shaped or sector scan.

The signal wave forms necessary to implement such a display in a multi-channel sonar are defined specifically by the following parametric equations:

$$V_H = R(t) \sin(\omega t), \quad (1)$$

$$V_V = R(t) \cosin(\omega t), \quad (2)$$

where
- $V_H$ is the voltage applied to the horizontal axis input of the cathode ray tube,
- $V_V$ is the voltage applied to the vertical axis input of the cathode ray tube,
- $R(t)$ is the range to the target — that is, a function of distance and the velocity of sound — expressed as a function of time $t$, and
- $(\omega t)$ is the target bearing expressed as a function of time $t$, with $\omega$ being the scanning rate employed.

As a theoretical example, presented for representative explanatory purposes only, if a 60 channel sonar with 2° channels and a maximum range of 511 pulse widths is assumed, $\omega(t)$ would go from $-\pi/3$ to $\pi/3$, and $R(t)$ would go from 0 to 511. Then, if the maximum range of this sonar were 511 yards, $R(t)$ would have a period of 0.614 seconds and $\omega$ would be 1746 radian/sec. or 278 Hz.

The foregoing signals, on the one hand, can be generated by simple prior art analog circuits using operational amplifiers connected as a simple harmonic oscillator tuned to 278 Hz. The oscillator would be reset every 1.2 milliseconds to the value of $R(t)$ at that time. But, if a scanner retrace time of 10 percent of 1.2 milliseconds is employed, it wold take 120 microseconds to effect such retrace, an exorbitant amount of time if high fidelity display is desired. On the other hand, if the same sonar were connected to a scan converter having a scan rate increased by 100, the retrace time would then be 1.2 microseconds, a time so short that it would not be possible to reset said operational amplifiers and hence, such prior art analog circuits would fail to accomplish their purpose, thereby, for all practical purposes, making them and the more rapid scanner inoperable. Therefore, it may readily be seen that if the signal processing within a raster generator can be speeded up, the resulting increased scan rate will provide improved target resolution on the face of the cathode ray tube display or other readout. Such signal processing improvement is effected in the subject invention by incorporating therein recently developed but now conventional and commercially available counters and read only memories (ROMs) employing digital and programmed table-look-up techniques.

Considering now the aforementioned equations (1) and (2), the $R(t)$ terms thereof are generated by a digital counter which counts each range increment and a reference digital-to-analog converter; the $\sin(\omega t)$ and $\cos(\omega t)$ terms thereof are respectively generated by said table-look-up operations of a pair of read only memories (ROMs) in response to the input signals addressed thereto by a pic-programmed digital channel counter; and the respective two products — that is, $R(t) \sin(\omega t)$ and $R(t) \cos(\omega t)$ — are produced by using a pair of multiplying digital-to-analog converters.

MODE OF OPERATION

The operation of the invention will now be discussed briefly in conjunction with all of the figures of the drawing.

Referring first to FIG. 1, oscillator 12 produces a basic clock or timing signal, preferably of the order of 798 KHz. Said 798 KHz timing signal is supplied to six stage digital channel counter 13 which counts from 0-63 and then puts out a signal to nine stage digital range counter 14 to effect the initiation of the counting function thereof every time counter 13 goes through 64 counts. The output of range counter 14 which is connected to the transmit trigger input of sonar 25 supplies a pulse thereto which causes it to broadcast a target search signal every time counter 14 is at zero.

The data output of range counter 14 supplies a 9 bit digital "number" to the input of reference digital-to-analog (D/A) converter which is proportional to time $(t)$ of the aforementioned equations (1) and (2). Reference digital-to-analog converter 15 then converts said "number" to an analog voltage that is proportional to the $R(t)$ terms of the above mentioned equations (1) and (2). Because said "number" changes with time $(t)$, it also changes with the range being searched by sonar 25 at any given instant; hence, the $R(t)$ voltage output varies in 512 step stair step fashion as schematically shown in FIG. 2 for each horizontal sweep across the face of cathode ray tube 23.

In order to effect the desired result in this invention, it has been determined that digital channel counter 13 must be programmed in a certain manner, and if ROMs 16 and 19 are to respectively produce outputs which are proportional to the sine and cosine of the address program from counter 13 at any given instant, they, too, must be programmed in certain manners. Accordingly, the programs of said 6 stage digital channel counter 13, said digital sine ROM 16, and said digital cosine ROM 19 are respectively presented in the following three columns:

ROM PROGRAMS

| BINARY ROM ADDRESS A-SUBSCRIPT IN FROM COUNTER 13 | SINE PROGRAM B-SUBSCRIPT OUT OF ROM 16 | COSINE PROGRAM B-SUBSCRIPT OUT OF ROM 19 |
|---|---|---|
| 543210 | 01234567 | 01234567 |
| 000000 | 10001110 | 10000000 |
| 000001 | 10010000 | 10000000 |
| 000010 | 10010010 | 10000011 |
| 000011 | 10010100 | 10001011 |
| 000100 | 10010111 | 10010010 |
| 000101 | 10011001 | 10011010 |
| 000110 | 10011100 | 10100001 |
| 000111 | 10011111 | 10101000 |
| 001000 | 10100010 | 10101110 |
| 001001 | 10100101 | 10110101 |
| 001010 | 10101000 | 10111011 |
| 001011 | 10101100 | 11000001 |
| 001100 | 10101111 | 11000111 |
| 001101 | 10110011 | 11001100 |
| 001110 | 10110110 | 11010001 |
| 001111 | 10111010 | 11010110 |
| 010000 | 10111110 | 11011011 |
| 010001 | 11000010 | 11100000 |
| 010010 | 11000110 | 11100100 |
| 010011 | 11001010 | 11101000 |
| 010100 | 11001110 | 11101011 |
| 010101 | 11010010 | 11101111 |
| 010110 | 11010110 | 11110010 |

ROM PROGRAMS-Continued

| BINARY ROM ADDRESS A-SUBSCRIPT IN FROM COUNTER 13 | SINE PROGRAM B-SUBSCRIPT OUT OF ROM 16 | COSINE PROGRAM B-SUBSCRIPT OUT OF ROM 19 |
|---|---|---|
| 010111 | 11011010 | 11110100 |
| 011000 | 11011110 | 11110111 |
| 011001 | 11100011 | 11111001 |
| 011010 | 11100111 | 11111011 |
| 011011 | 11101100 | 11111100 |
| 011100 | 11110000 | 11111110 |
| 011101 | 11110100 | 11111111 |
| 011110 | 11111001 | 11111111 |
| 011111 | 11111101 | 11111111 |
| 100000 | 00000010 | 11111111 |
| 110001 | 01001001 | 11010001 |
| 110010 | 01001101 | 11001100 |
| 110011 | 01010000 | 11000111 |
| 110100 | 01010100 | 11000001 |
| 110101 | 01010111 | 10111011 |
| 110110 | 01011010 | 10110101 |
| 110111 | 01011101 | 10101110 |
| 111000 | 01100000 | 10101000 |
| 111001 | 01100011 | 10100001 |
| 111010 | 01100110 | 10011010 |
| 111011 | 01101000 | 10010010 |
| 111100 | 01101011 | 10001011 |
| 111101 | 01101101 | 10000011 |
| 111110 | 01110000 | 10000000 |
| 111111 | 01110010 | 10000000 |

It may be seen from inspection of the above table that channels 0 and 1 and channels 62 and 63 are empty as far as programs are concerned. They are so programmed because such times are used to allow the change of direction of the beam in the cathode ray tube and to provide sufficient time for other electronic housekeeping functions to occur, inasmuch as so doing is required for the proper operation of a 60 channel sonar.

From the foregoing tables, it may also be seen that the numbers in the first column represent the address numbers timely supplied to ROMs 16 and 19 by counter 13, and the numbers in the second and third columns respectively represent the sine and cosine of said address numbers at any given instant. Of course, the output signal from sin ROM 16 is a digital signal that represents the term sin ($\omega t$) in the aforesaid equation (1), and the output signal from ROM 19 is a digital signal that represents the term cos ($\omega t$) in the aforesaid equation (2).

The digital signal representing sin ($\omega t$) is supplied to multiplying digital-to-analog (D/A) converter 18, which effects the multiplication $R$(by the output signal $R(t)$ from reference D/A converter 15 in such manner as to produce voltage $V_H$ of equation (1), which, ideally, has a waveform shaped somewhat similar to that shown in FIG. 3.

The digital signal representing cos ($\omega t$) is supplied to multiplying digital-to-analog (D/A) converter 22, which effects the multiplication thereof by the $R(t)$ output signal from said reference D/A converter 15 in such manner as to produce voltage $V_V$ of equation (2), which, ideally, has a waveform shaped somewhat similar to that shown in FIG. 4.

As a result of said $V_H$ and $V_V$ voltages being supplied to the horizontal and vertical sweeps of cathode ray tube 23, respectively, a sector raster is effected on the face thereof that appears somewhat similar to that shown in FIG. 5.

Of course, sonar 25 (or radar 25, as the case may be) supplies the indication of any acquired target by lighting up the raster at the spot that represents the bearing and range thereof in response to the video signal from sonar 25, as is customary in the art. However, because of the exceedingly rapid sector scanning effected by the subject digital raster generator 11, the resolution thereof is improved considerably over that obtainable from any known prior art. Hence, it may be said that the fidelity of the display of cathode ray tube 23 or any other readout 24 is improved, too.

Although cathode ray 23 is the only readout specifically disclosed herein, it would be well within the purview of one skilled in the art having the benefit of the teachings presented herein to apply output voltages $V_H$ and $V_V$ to the X and y coordinate operators of any other compatible readout 24.

Likewise, the artisan would be able, from the teachings presented herein, to select and design other channels 27 and 28 which respectively include preprogrammed ROMs and multiplying D/A converters (such as, for example, 29 and 31), in order to supply suitable parametric voltages to any compatible utilization apparatus 26. And, obviously, the aforesaid $V_H$ and $V_V$ voltages could also be supplied to any other compatible utilization apparatus 26 as operatives therefor. Of course, said utilization apparatus 26, being only generally described herein, may, in addition, be optionally modified to be responsive to some other parameter or data input signal for any desired purpose.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. An apparatus of the character described, comprising in combination:

means for producing a basic timing signal having a predetermined frequency;

a programmable first digital counter, having a predetermined number of stages, a clock input, a trigger output, and an address output, with the clock input thereof connected to the output of said basic timing signal producing means and with the address output thereof adapted for being connected to a predetermined multi-channel utilization apparatus;

a second digital counter, having a predetermined number of stages, a data signal input, a data signal output, and an actuation trigger output for being connected to an actuation input of the aforesaid predetermined multi-channel utilization apparatus, with the data signal input thereof connected to the trigger output of said programmable first digital counter;

a reference digital-to-analog converter, having a predetermined bit capacity, connected to the data signal output of said second digital counter;

a first programmable read only memory, having a predetermined bit capacity, connected to the address output of the aforesaid first digital counter;

a first multiplying digital-to-analog converter, having a predetermined bit capacity, a pair of inputs, and an output, with one of the inputs thereof connected to the output of the aforesaid reference digital-to-analog converter, and with the other input thereof connected to the output of said first programmable read only memory;

a second programmable read only memory, having a predetermined bit capacity, connected to the address output of the aforesaid first digital counter; and a second multiplying digital-to-analog converter, having a predetermined bit capacity, a pair of inputs, and an output, with one of the inputs thereof connected to the output of the aforesaid reference digital-to-analog converter, and with the other input thereof connected to the output of said second programmable read only memory.

2. The device of claim 1, wherein said means for producing a basic timing signal having a predetermined frequency comprises an adjustable frequency oscillator.

3. The device of claim 1, wherein said means for producing a basic timing signal having a predetermined frequency comprises an oscillator for producing an output signal having a frequency of 798 KHz.

4. The device of claim 1 wherein said programmable first digital counter, having a predetermined number of stages, a clock input, a trigger output, and an address output, with the clock input thereof connected to the output of said basic timing signal producing means comprises a programmable six stage digital channel counter.

5. The device of claim 1, wherein said second digital counter, having a predetermined number of stages, a data signal input, a data signal output, and an actuation trigger output adapted for being connected to an actuation input of the aforesaid predetermined multichannel utilization apparatus, with the data signal input thereof connected to the trigger output of said programmable first digital counter comprises a nine stage digital range counter.

6. The device of claim 1, wherein said reference digital-to-analog converter, having a predetermined bit capacity, connected to the data signal output of said second digital counter comprises a nine bit digital-to-analog converter.

7. The device of claim 1, wherein said first programmable read only memory, having a predetermined bit capacity, connected to the address signal output of said first digital counter comprises a 512 bit digital read only memory that is programmed for converting the address signal supplied thereto into an output signal that is proportional to the sine thereof.

8. The device of claim 1, wherein said first multiplying digital-to-analog converter, having a predetermined bit capacity, a pair of inputs, and an output, with one of the inputs thereof connected to the output of the aforesaid reference digital-to-analog converter, and with the other input thereof connected to the output of said first programmable read only memory comprises an 8 bit multiplying digital-to-analog converter.

9. The device of claim 1, wherein said second programmable read only memory, having a predetermined bit capacity, connected to the address output of said first digital counter comprises a 512 bit digital read only memory that is programmed for converting the address signal supplied thereto into an output signal that is proportional to the cosine thereof.

10. The device of claim 1, wherein said second multiplying digital-to-analog converter, having a predetermined bit capacity, a pair of inputs, and an output, with one of the inputs thereof connected to the output of the aforesaid reference digital-to-analog converter, and with the other input thereof connected to the output of said second programmable read only memory comprises an eight bit multiplying digital-to-analog converter.

11. The invention of claim 1, further characterized by another utilization apparatus having a plurality of inputs, with one of the inputs thereof connected to the output of said first multiplying digital-to-analog converter, with another of the inputs thereof connected to the output of said second multiplying digital-to-analog converter, and with the remaining inputs thereof adapted for being connected for response to predetermined signals supplied thereto.

12. The invention of claim 1, further characterized by a readout having a horizontal coordinant sweep input, a vertical coordinant sweep input, and a data signal input, with the horizontal coordinant sweep input thereof connected to the output of said first multiplying digital-to-analog converter, and with the vertical coordinant sweep input thereof connected to the output of the aforesaid second multiplying digital-to-analog converter, and with the data signal input thereof adapted for being connected to the data signal output of said predetermined utilization apparatus.

13. The invention of claim 12, wherein said predetermined utilization apparatus comprises a multi-channel sonar having a channel scanner signal input, an actuation signal input, and a data signal output, with the channel scanner input thereof connected to the address output of the aforesaid first digital counter, with the actuation trigger input thereof connected to the actuation trigger output of said second digital counter, and with the data signal output thereof connected to the data signal input of said readout.

14. The invention of claim 12, wherein said predetermined utilization apparatus comprises a multi-channel radar having a channel scanner signal input, an actuation input, and a data signal output, with the channel scanner input thereof connected to the address output of the aforesaid first digital counter, with the actuation trigger input thereof connected to the actuation trigger output of said second digital counter, and with the data signal output thereof connected to the data signal input of the aforesaid readout.

15. The invention of claim 1, further characterized by a cathode ray tube having a horizontal coordinant sweep input, a vertical coordinant sweep input, and a data signal input, with the horizontal coordinant sweep input thereof connected to the output of the aforesaid first multiplying digital-to-analog converter, with the vertical coordinant sweep input thereof connected to the output of the aforesaid second multiplying digital-to-analog converter, and with the data signal input thereof adapted for being connected for response to the video output signal of said predetermined utilization apparatus.

16. The invention of claim 15, wherein said predetermined utilization apparatus comprises a multi-channel sonar having a channel scanner input, an actuation input, and a video signal output, with the channel scanner input thereof connected to the address output of the aforesaid first digital counter, with the actuator trigger input thereof connected to the actuator trigger output of said second digital counter, and with the video signal output thereof connected to the video signal input of the aforesaid cathode ray tube.

17. The invention of claim 15, wherein said predetermined utilization apparatus comprises a multi-channel radar having a channel scanner input, an actuation input, and a video signal output, with the channel scanner input thereof connected to the address output of the aforesaid first digital counter, with the actuation trigger input thereof connected to the actuator trigger output of said second digital counter, and with the video signal output thereof connected to the video signal input of the aforesaid cathode ray tube.

* * * * *